United States Patent [19]

Ogawa et al.

[11] Patent Number: 5,306,041
[45] Date of Patent: Apr. 26, 1994

[54] GAS GENERATOR HAVING HOUSING OF DOUBLE STRUCTURE

[75] Inventors: Akihisa Ogawa; Osamu Muramatsu, both of Hyogo, Japan

[73] Assignee: Daicel Chemical Industries, Ltd., Japan

[21] Appl. No.: 983,569

[22] PCT Filed: Jun. 22, 1992

[86] PCT No.: PCT/JP92/00793
§ 371 Date: Mar. 29, 1993
§ 102(e) Date: Mar. 29, 1993

[87] PCT Pub. No.: WO93/00234
PCT Pub. Date: Jan. 7, 1993

[30] Foreign Application Priority Data

Jun. 21, 1991 [JP] Japan .................. 3-150337

[51] Int. Cl.$^5$ ............................................. B60R 21/28
[52] U.S. Cl. ......................... 280/741; 280/740; 102/530; 422/166
[58] Field of Search ........... 280/741, 740, 736, 728 R; 102/530, 531; 422/164, 165, 166

[56] References Cited

U.S. PATENT DOCUMENTS

| | | | |
|---|---|---|---|
| 3,985,076 | 10/1976 | Schaiter et al. | 280/741 |
| 4,278,638 | 7/1981 | Nilsson et al. | 422/166 |
| 4,547,342 | 10/1985 | Adams et al. | 422/166 |
| 5,062,367 | 11/1991 | Hageshi et al. | 102/530 |
| 5,100,174 | 3/1992 | Jaskea et al. | 280/741 |
| 5,139,280 | 8/1992 | Cord et al. | 422/165 X |
| 5,149,129 | 9/1992 | Anterfersthamer et al. | 280/741 |

FOREIGN PATENT DOCUMENTS 2625961 7/1989 France .
152639 11/1980 Japan .

Primary Examiner—Margaret A. Focarino
Assistant Examiner—Christopher P. Ellis
Attorney, Agent, or Firm—Weingram & Zall

[57] ABSTRACT

The present invention relates to a gas generator for an air bag, particularly to the improvement of a housing for a gas generator.

The gas generator according to the present invention is characterized having a combustion chamber formed with a housing having an annular top wall fixed at an inner edge portion thereof to a circumferential edge of a top wall of a central cylindrical holder, and an annular bottom wall fixed at an inner edge portion thereof to an edge portion of an opposite end of the holder. A diffuser is provided to cover the top wall of the central cylindrical holder and the annular top wall of the combustion chamber, whereby a double wall covering the combustion chamber is formed. An annular closure is provided so as to cover a bottom wall of the housing of the combustion chamber and is welded at an inner edge portion thereof to the edge portion of the lower end of the central cylindrical holder. An outer end of the closure is welded to an extended portion of the diffuser to form a filter/coolant chamber. Outlet ports for a gas from the filter/coolant chamber are provided in the extended portion of the diffuser.

18 Claims, 1 Drawing Sheet

GAS GENERATOR HAVING HOUSING OF DOUBLE STRUCTURE

FIELD OF THE INVENTION

The present invention relates to a gas generator having a thin-walled structure for use with an inflatable air bag for protecting the occupant(s) of an automobile, and more particularly to an improvement in a housing of a gas generator to provide a double wall structure. The gas generator is suitably incorporated in a steering wheel so as to protect a driver of a passenger car when the collision of the car occurs.

BACKGROUND OF THE INVENTION

As is generally known, a conventional safety device provided in a passenger car to protect occupants of the car from an impact occurring during a collision comprises an air bag, and a gas generator for inflating the air bag in a very short period of time.

This gas generator has, as main constituent elements, a centrally positioned igniter in which a squib/enhancer is held, a cylindrical combustion chamber formed about the igniter and housing gas generants therein, and a cross-sectionally rectangular filter/coolant chamber formed about the combustion chamber wherein a gas generated in the combustion chamber passes through a filter and a coolant and flows through gas outlet ports into an air bag.

Various types of structures wherein a housing forms a combustion chamber and a filter/coolant chamber for a gas generator have heretofore been proposed.

For example, a pressure container is used which consists of a case formed by subjecting a stainless plate to press working, and then welding the case at bolts set at the central portion thereof, and at rivets set at the circumferential portion and the outer circumferential portion thereof. The container for gas generants disclosed in U.S. Pat. No. 4,547,342 (Morton Thiokol, Inc.) consists of upper and lower halved shell bodies, and partition walls for forming three cylinders in the halved shell bodies.

Japanese Patent Publication-A No. 152639/1980 (Bayern Chemie GmbH.) discloses a gas generator having a central cylinder holding an igniter therein, a cover and an S-shaped casing which form a combustion chamber and a filter chamber. Outlet ports of the filter chamber (expansion chamber) are formed in an extended portion of the casing by punching slits therein.

However, in order to incorporate any of these conventional gas generators in a steering wheel of an automobile, it is necessary that the thickness of the wall, particularly the wall which faces a driver, of the housing at the combustion chamber be made large, and this causes the weight of the housing to increase. Moreover, since the sealing of the gas generants is done by welding, a gas generator assembly line and the equipment required become complicated.

An object of the present invention is to provide a gas generator of a weight-reduced structure having a housing with a thin plate sealed by a non-welding method, which is advantageous with respect to the manufacturing equipment required to manufacture the generator.

SUMMARY OF THE INVENTION

The present invention relates to a gas generator having a central cylindrical holder in which a squib/enhancer is housed, a combustion chamber surrounding the holder for holding gas generants therein, a filter/coolant chamber formed annularly so as to surround the combustion chamber, the filter/coolant chamber adapted to allow the entry thereinto of a gas from the combustion chamber, and gas outlet ports formed about the filter/coolant chamber through which the gas, which has passed through a filter and coolant, rushes out and into an air bag. The gas generator of the present invention is characterized in that the combustion chamber 10 is formed with a housing 14 having an annular top wall fixed at an inner edge portion thereof to a circumferential edge of a top wall of the center cylindrical holder 4, and an annular bottom wall fixed at an inner edge portion thereof to an edge portion of an opposite end of the holder 4. A diffuser 12 is provided to cover the top wall of the central cylindrical holder and the top wall of the housing of the combustion chamber, whereby a double wall of the combustion chamber is formed. An annular closure 17 is provided to cover the bottom wall of the housing of the combustion chamber. The annular closure 17 is welded at an inner edge portion thereof to the edge portion of the lower end of the central cylindrical holder. An outer end of the annular closure is welded to an extended portion of the diffuser to form the filter/coolant chamber, the outlet ports for a gas from the filter/coolant chamber being provided in the extended portion of the diffuser.

In the gas generator according to the present invention, the upper and lower plate portions of the combustion chamber, in which the pressure becomes high, are doubly formed. To accomplish this, the circular plate of the diffuser is laminated on the annular top wall of the housing so that the combustion chamber is formed with a double wall, the annular plate of the closure on the annular bottom wall of the combustion chamber also forming a double wall. The combustion chamber is thus doubly formed, and the safety of the gas generator is secured advantageously. The expansion chamber (filter/coolant chamber) is formed from a combination of the extended portion of the diffuser and a flange at the outer circumference of the closure 17. The resulting pressure container formed is a double-walled structure which consists of a housing forming the combustion chamber and a housing for covering all parts of the gas generator including the combustion chamber. According to the present invention, when the housing of the combustion chamber in the gas generator is formed, the sealing of the gas generants in the combustion chamber can be done by a non-welding method.

For example, the housing 14 forming the combustion chamber is a structure which is made by: welding the inner circumferential edge of the annular top wall of the combustor cup to the circumferential edge of the top wall of the central cylindrical holder, then inserting gas generants in the combustion chamber, fixing the cover forming the annular bottom wall to the edge portion of the lower end of the central cylindrical holder, and crimping the circumferential edge portion of the cover to the edge portion at the lower end of a side wall of the combustor cup, whereby the gas generants are sealed.

Alternatively, the structure is made by: welding the annular bottom wall of the combustor cup to the edge portion of the lower end of the central cylindrical holder, inserting gas generants in the combustion chamber, and then bending the upper end portion of the combustor cup by a press and fixing the bent end portion to the circumferential edge of the top wall of the central cylindrical holder by riveting, whereby the gas generants are sealed.

According to the housing structure of the present invention, the weight thereof can be reduced owing to the employment of a thin-walled structure of aluminum and the like, which can be produced by press working. Moreover, because the gas generants can be sealed in the combustion chamber by a non-welding method, the assembly line and the relative equipment used are simplified.

When the housing structure of the gas generator in the present invention is employed, the following effects can be obtained: (1) Since the upper and lower plate portions of the combustion chamber, in which the pressure becomes high, are doubly formed, the safety of the gas generator can be secured advantageously. Since these walls (the upper and lower plate portions) can be formed from thin plates, the weight of the device can be reduced. (2) Since the sealing of the gas generants in the combustion chamber can be done by a non-welding method, an assembly line and the relative equipment used to manufacture the generator can be simplified.

DETAILED DESCRIPTION OF THE PREFERRED EMBODIMENTS

Figure 1:
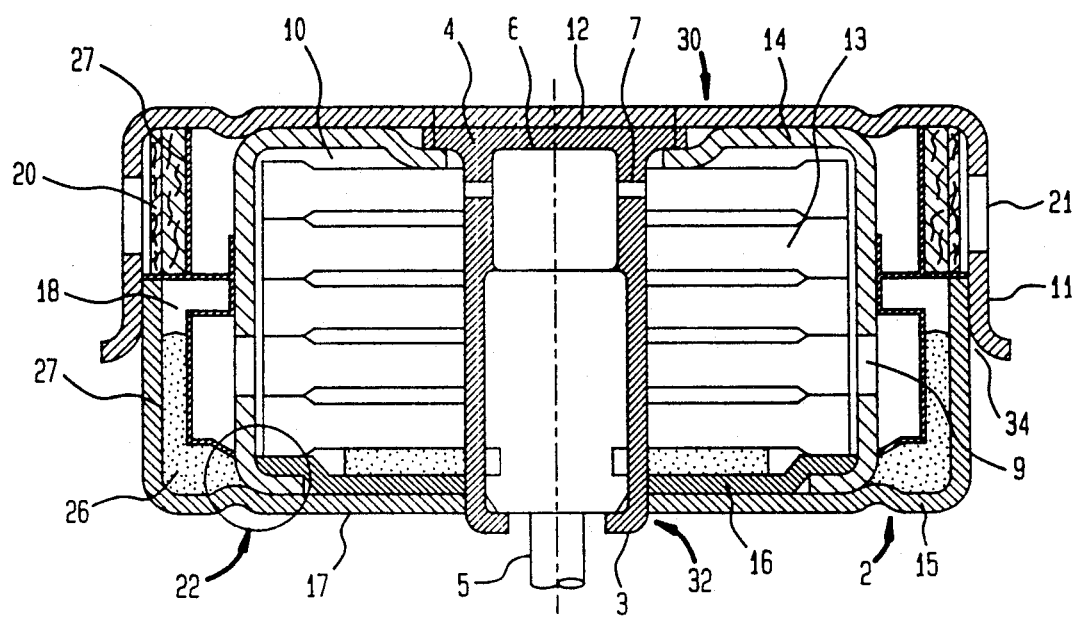
FIG. 1 is a schematic longitudinal cross-section of an embodiment of the gas generator according to the present invention.

The details of the present invention will now be described on the basis of the embodiments thereof shown in the drawings.

FIG. 1 shows a longitudinal cross-sectioned side elevation of an embodiment of the gas generator according to the present invention used to inflate an air bag for protecting the occupants in an automobile.

A gas generator 2 covered at is upper portion with a folded expansible air bag (not shown) cooperates with a collision sensor (not shown) to form a safety device for protecting the occupants in an automobile, the safety device being held with the air bag in a steering wheel of the automobile.

The gas generator 2 includes a central cylindrical holder 4 housing a squib/enhancer in the central portion thereof. After the squib/enhancer has been inserted in the holder 4, the lower end portion of the holder is crimped (shown by a reference numeral 3) and connected to a collision sensor through conductor 5. The inner circumferential edge of an annular top wall of a cylindrical combustor cup 14 is welded to the circumferential edge of a top wall of the holder 4 to form a combustion chamber 10, in which a required number of disc type gas generants 13 were previously positioned in layers. An annular cover 16 forming a bottom wall of the combustion chamber 10 is then set on the circumferential edge portion of the lower end of the central cylindrical holder 4. The lower end portion of the combustor cup is crimped to the outer circumferential edge portion of this cover 16 (shown by a reference numeral 22), whereby the gas generants are sealed inside the combustion chamber. On the outer side of the housing formed with the combustion chamber is a disc type diffuser 12, having an extended portion 11, which is laminated on the occupant-side top walls of the central holder 4 and combustor cup 14, and an annular closure 17 on the opposite top wall of the combustor cup 14. The extended portion 11 of the diffuser 12, and a flange 15 at the outer circumference of the closure 17, form a filter/coolant chamber (expansion chamber) 18 in which a filter and a coolant are provided. The outer circumferential edge of the flange 15 is welded (shown by a reference numeral 34) to the inner circumferential edge of the lower end of the extended portion 11, as is the inner circumferential edge of the closure 17 and the inner circumferential edge of the cover 16 to the outer circumferential edge of the lower end portion of the central holder 4. A combustion gas produced from the gas generants 13 is ignited by an igniter 6 through the openings 7 provided in the circumferential wall of the holder 4. The combustion gas flows through a plurality of communication ports 9, provided in an annular side wall of the combustor cup 14, into the expansion chamber 18 and then passes through a coolant 26 and a filter 20 therein. The resultant gas flows out of a plurality of gas outlet ports 21, provided in an outer side wall of the diffuser 12, into an air bag to inflate and expand the same instantaneously. A retainer 27 is provided between the coolant 26 and filter 20 so that a gas flow first impinges upon the coolant 26 and then passes through the filter 20.

In the housing of the gas generator according to the present invention and shown in FIG. 1, the connecting of the central cylindrical holder 4 with combustor cup 14 and closure 17, and the connecting of the diffuser 12 with closure 17 are done via annular welding seams 30, 32, 34 by electron beam welding or laser beam welding. The edge of the lower end portion of a side wall of the combustor cup 14 is affixed to the circumference of the cover 16 by crimping 22 after the insertion of the gas generants 13 into the combustor cup 14 is completed.

Figure 2:
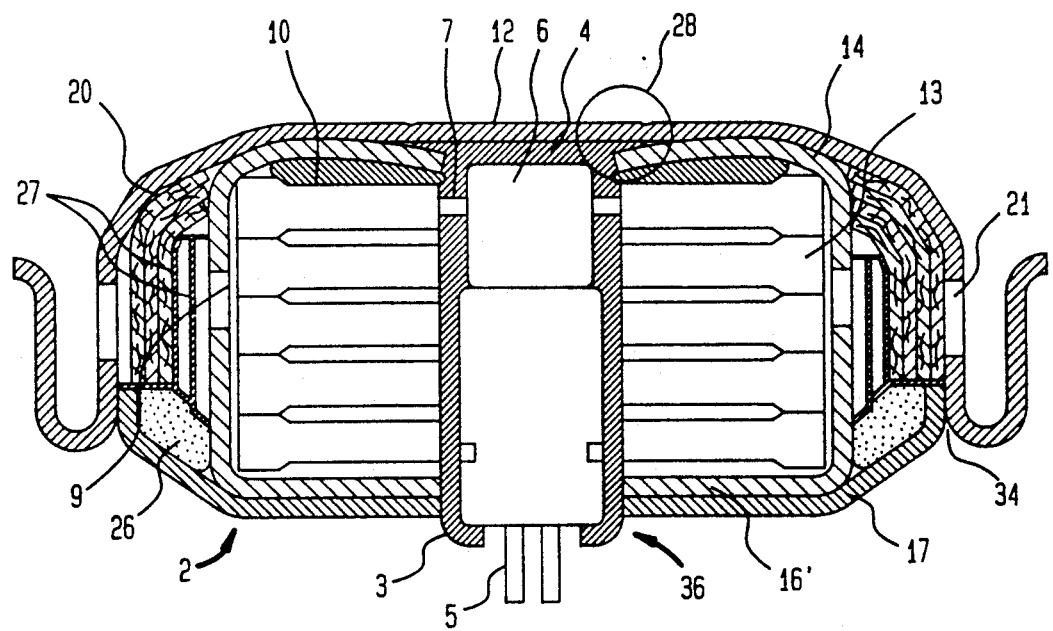
FIG. 2 is a schematic longitudinal cross-section of another embodiment of the gas generator according to the present invention.

FIG. 2 shows a schematic longitudinal cross-section of another embodiment of the gas generator according to the present invention. This embodiment is substantially the same as the embodiment of FIG. 1 except for the housing of a combustion chamber.

The embodiment of FIG. 2 differs from that of FIG. 1 in the following manner. In order to form a housing, having a combustion chamber 10 with a combustor cup 14, an annular bottom wall 16' is welded (annular welding seam 36) to the edge portion of the lower end of a hollow cylindrical holder 4. Gas generants 13 are then inserted in the combustion chamber. The upper end portion of the combustor cup 14 is bent by a press and fixed to the circumferential portion of the top wall of the hollow cylindrical holder 4 by riveting 28, whereby the gas generants are sealed in the combustion chamber.

What is claimed is:

1. A gas generator having a central cylindrical holder in which a squib/enhancer is housed, a combustion chamber surrounding said holder and holding gas generants therein, a filter/coolant chamber formed annularly so as to surround said combustion chamber, and adapted to allow the entry thereinto of a gas which has passed through openings thereof communicating with said combustion chamber, and gas outlet ports formed at said filter/coolant chamber and through which the gas which has passed through a filter and a coolant rushes into an air bag, characterized in that said combustion chamber (10) is formed with a housing (14) having an annular top wall fixed at an inner edge portion thereof to a circumferential edge of a top wall of said central cylindrical holder (4), and an annular bottom wall fixed at an inner edge portion thereof to an edge portion of an opposite end of said holder, a diffuser (12) being provided so as to cover said top wall of said central cylindrical holder and a top wall which is joined thereto of said housing of said combustion chamber, whereby a double wall of said combustion chamber is formed, an annular closure (17) being provided so as to cover a bottom wall of said housing of said combustion chamber and be welded at an inner edge portion thereof to the edge portion of the lower end of said central cylindrical holder, an outer end of said closure being welded to an extended portion of said diffuser to form said filter/coolant chamber, said outlet ports for a gas from said filter/coolant chamber being provided in said extended portion of said diffuser.

2. The gas generator according to claim 1, wherein said housing (14) forming said combustion chamber is constructed so that said gas generants are placed therein after an inner circumferential edge portion of an annular top wall of a combustor cap has been welded to the circumference of said top wall of said central cylindrical holder, a cover which forms an annular bottom wall of said housing being then fixed to an edge portion of a lower end of said central cylindrical holder, a circumferential portion of said cover being crimped to an edge portion of a lower end of a side wall of said combustor cup to seal said gas generants.

3. The gas generator according to claim 1, wherein said housing (14) forming said combustion chamber is constructed so that said gas generants are placed therein after an annular bottom wall of said combustor cup has been welded to an edge portion of a lower end of said central cylindrical holder, an upper end portion of said combustor cup being then bent by a press and fixed by riveting to a circumferential edge of said top wall of said central cylindrical holder to seal said gas generants.

4. The gas generator according to claim 2, wherein said second fastening means is a weld and said first fastening means is riveting to seal said combustion means in said second housing.

5. The gas generator according to claim 2, wherein said second top and bottom walls, and said third top and bottom walls are annular.

6. The gas generator according to claim 2, wherein said third top wall is laminated onto said first and second top walls.

7. The gas generator according to claim 2, wherein said third top wall is a disc-type diffuser.

8. The gas generator according to claim 2, wherein said igniting means is a squib or enhancer.

9. The gas generator according to claim 2, wherein said combustion means is disc-type gas generants.

10. The gas generator according to claim 2, wherein said second passage means is a plurality of communication ports.

11. The gas generator according to claim 2, wherein said third passage means is a plurality of communication ports.

12. The gas generator according to claim 2, wherein said third top and bottom walls, and said third side wall defined a filter and coolant chamber in said third housing.

13. The gas generator according to claim 2, wherein said third housing includes means for directing gasses, said directing means disposed in said filter and coolant chamber to direct said gasses to impinge on said coolant and then pass through said filter.

14. The gas generator according to claim 2, wherein said third housing surrounds said second housing and said second housing surrounds said first housing.

15. A gas generator for inflating an air bag comprising:
a first housing having:
a first top wall,
a first bottom wall,
a continuous first side wall connecting first top and bottom walls,
passage means through said first side wall, and
igniting means disposed in said first housing;
a second housing having:
a second top wall,
a second bottom wall,
said second top and bottom walls extending to, form a continuous second side wall, and
passage means through said continuous second side wall, and
combustion means disposed in said second housing,
a third housing having:
a third top wall,
a third bottom wall,
said third top and bottom walls extending to form a continuous third side wall, and
passage means through said continuous third side wall; wherein:
said third top wall overlying said first and second top walls,
said third top wall overlying said second bottom wall;
first means fastening said second top wall to said first housing;
second means fastening said second bottom wall to said first housing;
third means fastening said third top wall to said third bottom wall; and
fourth means fastening said third bottom wall to said first housing;
said first passage means in said first side wall coacting with said second passage means in said second side wall and said third passage means in said third side wall to enable gasses from said combustion means ignited by said igniting means in said first housing to ignite said combustion means in said second housing and pass said gasses through said third passage means in said third side wall to said air bag.

16. A gas generator having a central cylindrical holder in which a squib or enhancer is housed, a combustion chamber surrounding said holder and holding gas generants therein, a filter and coolant chamber formed annularly so as to surround said combustion chamber, and adapted to allow the entry thereinto of a gas which has passed through openings thereof communicating with said combustion chamber, and gas outlet ports formed at said filter and coolant chamber and through which the gas which has passed through a filter and a coolant rushes into an air bag, characterized in that said combustion chamber (10) is formed with a housing 14 having an annular top wall fixed at an inner edge portion thereof to a circumferential edge of a top wall of said central cylindrical holder (4), and an annular bottom wall fixed at an inner edge portion thereof to an edge portion of an opposite end of said holder, a diffuser(12) being provided so as to cover said top wall of said central cylindrical holder and a top wall which is joined thereto of said housing of said combustion chamber, whereby a double wall of said combustion chamber is formed, an annular closure (17) being provided so as to cover a bottom wall of said housing of said combustion chamber and be welded at an inner edge portion thereof to the edge portion of the lower end of said central cylindrical holder, an outer end of said closure being welded to an extended portion of said diffuser to form said filter and coolant chamber, said outlet ports for a gas from said filter and coolant chamber being provided in said extended portion of said diffuser.

17. The gas generator according to claim 1, wherein said housing (14) forming said combustion chamber is constructed so that said gas generants are placed therein after an inner circumferential edge portion of an annular top wall of a combustor cap has been welded to the circumference of said top wall of said central cylindrical holder, a cover which forms an annular bottom wall of said housing being then fixed to an edge portion of a lower end of said central cylindrical holder, a circumferential portion of said cover being crimped to an edge portion of a lower end of a side wall of said combustor cup to seal said gas generants.

18. The gas generator according to claim 1, wherein said housing (14) forming said combustion chamber is constructed so that said gas generants are placed therein after an annular bottom wall of said combustor cup has been welded to an edge portion of a lower end of said central cylindrical holder, an upper end portion of said combustor cup being then bent by a press and fixed by riveting to a circumferential edge of said top wall of said central cylindrical holder to seal said gas generants.

* * * * *

UNITED STATES PATENT AND TRADEMARK OFFICE
CERTIFICATE OF CORRECTION

PATENT NO. : 5,306,041
DATED : April 26, 1994
INVENTOR(S) : Akihisa OGAWA, Osamu MURAMATSU It is certified that error appears in the above-indentified patent and that said Letters Patent is hereby corrected as shown below:

Column 4, line 54 to Column 5, line 37, delete Claims 1-3 and insert therefor:

--1. A gas generator for inflating an air bag, comprising:
    a first housing having:
    a first top wall,
    a first bottom wall,
    a continuous first side wall connecting said first top and bottom walls,
    first passage means through said first side wall,
    and igniting means disposed in said first housing;
a second housing having:
    a second top wall,
    a second bottom wall,
    said second top and bottom walls extending to form a continuous second side wall,
    second passage means through said continuous second side wall, and
    combustion means disposed in said second housing;
and a third housing having:
    a third top wall,
    a third bottom wall,
    said third top and bottom walls extending to form a continuous third side wall, and
    third passage means through said continuous third side wall; wherein,
    said third top wall overlying said first and second top walls,
    said third bottom wall overlying said second bottom wall;

UNITED STATES PATENT AND TRADEMARK OFFICE
CERTIFICATE OF CORRECTION

PATENT NO. : 5,306,041
DATED : April 26, 1994
INVENTOR(S) : Akihisa OGAWA, Osamu MURAMATSU It is certified that error appears in the above-indentified patent and that said Letters Patent is hereby corrected as shown below:

first means fastening said second top wall to said first housing;
    second means fastening said second bottom wall to said first housing;
    third means fastening said third top wall to said third bottom wall;
    said first passage means in said first side wall coacting with said second passage means in said second side wall and said third passage means in said third side wall to enable gasses from said combustion means ignited by said igniting means in said first housing to ignite said combustion means in said second housing and pass said gasses through said third passage means in said third side wall to said air bag.

2. The gas generator according to claim 1, further including fourth means fastening said third bottom wall to said first housing wherein said fourth fastening means and said third fastening means is a weld.

UNITED STATES PATENT AND TRADEMARK OFFICE
CERTIFICATE OF CORRECTION

PATENT NO.   :   5,306,041
DATED        :   April 26, 1994
INVENTOR(S)  :   Akihisa OGAWA, Osamu MURAMATSU It is certified that error appears in the above-indentified patent and that said Letters Patent is hereby corrected as shown below:

3.   The gas generator according to claim 2, wherein said first means is a weld and said fourth means is a crimp to seal said combustion means in said second housing.--

Column 7, line 12, "1" should be --16--.

Column 8, line 7, "1" should be --16--.

Signed and Sealed this

Twentieth Day of June, 1995

Attest:

BRUCE LEHMAN

Attesting Officer     Commissioner of Patents and Trademarks